(12) United States Patent
Harrigan

(10) Patent No.: US 11,135,556 B2
(45) Date of Patent: Oct. 5, 2021

(54) CROSSLINKED POLYETHYLENE GLYCOL POLYMER MEMBRANES FOR GAS SEPARATION

(71) Applicant: Saudi Arabian Oil Company, Dhahran (SA)

(72) Inventor: Daniel J. Harrigan, Cambridge, MA (US)

(73) Assignee: Saudi Arabian Oil Company, Dhahran (SA)

(*) Notice: Subject to any disclaimer, the term of this patent is extended or adjusted under 35 U.S.C. 154(b) by 295 days.

(21) Appl. No.: 16/291,563

(22) Filed: Mar. 4, 2019

(65) Prior Publication Data

US 2020/0282363 A1 Sep. 10, 2020

(51) Int. Cl.
*B01D 71/52* (2006.01)
*B01D 67/00* (2006.01)
(Continued)

(52) U.S. Cl.
CPC ......... *B01D 71/52* (2013.01); *B01D 67/0006* (2013.01); *B01D 67/0013* (2013.01);
(Continued)

(58) Field of Classification Search
CPC .............. B01D 53/228; B01D 67/0006; B01D 67/0013; B01D 69/10; B01D 69/12;
(Continued)

(56) References Cited

U.S. PATENT DOCUMENTS

| 4,115,465 A * | 9/1978 | Elfert ..................... B01D 71/54 208/308 |
| 2015/0258505 A1* | 9/2015 | Hironaka ............... B01D 69/10 95/51 |

(Continued)

FOREIGN PATENT DOCUMENTS

| WO | 2012133737 A1 | 10/2012 |
| WO | 2017019870 A1 | 2/2017 |
| WO | 2018020949 A1 | 2/2018 |

OTHER PUBLICATIONS

Carvalho, L.M. et al., "Synthesis and Electrochemical Characterization of Crosslinked Poly(ethylene oxide) Containing LiN(CF3SO2)2", Eur. Polym. J., vol. 33, No. 10-12, 1997, pp. 1741-1745. (Year: 1997).*

(Continued)

*Primary Examiner* — Jason M Greene
(74) *Attorney, Agent, or Firm* — Dinsmore & Shohl LLP

(57) ABSTRACT

A polymer membrane, methods of gas separation utilizing the polymer membrane, and methods of producing the polymer membrane are disclosed herein. The polymer membrane includes a crosslinked polyethylene glycol network polymer according to formula (I):

(Continued)

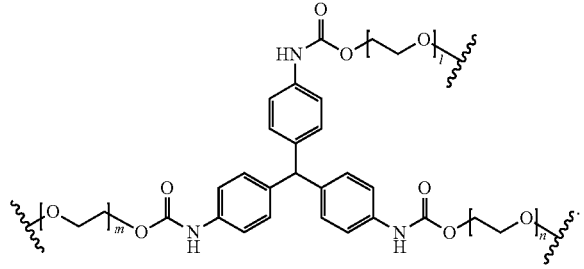

(I)

20 Claims, 9 Drawing Sheets

(51) Int. Cl.
 B01D 69/10 (2006.01)
 B01D 71/42 (2006.01)
 B01D 71/48 (2006.01)
(52) U.S. Cl.
 CPC ............. *B01D 69/10* (2013.01); *B01D 71/42* (2013.01); *B01D 71/48* (2013.01); *B01D 2257/304* (2013.01); *B01D 2257/504* (2013.01); *B01D 2323/30* (2013.01); *B01D 2325/04* (2013.01)
(58) Field of Classification Search
 CPC .. B01D 71/52; B01D 71/54; B01D 2257/304; B01D 2257/504; B01D 2323/30; B01D 2325/04
 See application file for complete search history.

(56) References Cited

U.S. PATENT DOCUMENTS

| 2016/0102180 | A1 | 4/2016 | Vautard et al. |
| 2016/0319175 | A1 | 11/2016 | Gong et al. |
| 2017/0205221 | A1 | 7/2017 | Gong et al. |
| 2017/0266625 | A1* | 9/2017 | Kiguchi ................ B01D 71/52 |
| 2018/0258215 | A1 | 9/2018 | Lomba Huguet et al. |

OTHER PUBLICATIONS

Chatterjee, G. et al., "Poly(ether urethane) and poly(ether urethane urea) membranes with high H2S/CH4 selectivity", Journal of Membrane Science, 135, 1997, pp. 99-106. (Year: 1997).*
Scholes et al., "Crosslinked PEG and PEBAX membranes for concurrent permeation of water and carbon dioxide" Membranes, 2016.
Kwisnek et al., "PEG Containing Thiol-Ene Network Membranes for CO2 Separation: Effect of Cross-Linking on Thermal, Mechanical, and Gas Transport Properties" Macromolecules, 2014, 3243.
Kusuma et al., "Influence of chemical structure of short chain pendant groups on gas transport properties of cross-linked poly(ethylene oxide) copolymers" Journal of Membrane Sciences, 2009, 195.
Lin et al., "Gas solubility and diffusivity in poly(ethylene oxide)" Journal of Membrane Sciences, 2004, 105.
Li et al., "Gas permeation properties of poly(urethane-urea)s containing different polyethers" Journal of Membrane Sciences, 2011, 49.
Liu et al., "Effect of UV Irradiation and Physical Aging on O2 and N2 Transport Properties of Thin Glassy Poly (arylene Ether Ketone) Copolymer Films Based on Tetramethyl Bisphenol A and 4,4'-difluorobenzophenone." Polymer, 2016, 202.
Carvalho et al., "Synthesis and Electrochemical Characterization of Crosslinked Poly(Ethylene Oxide) Containing LiN(DF3S02)2", Eur. Polym. J. vol. 33, No. 10-12, pp. 1741-1745, 1997.
Killis et al., "Dynamic Mechanical Properties of Crosslinked Polyurethanes Containing Sodium Tetraphenylborate", Journal of Polymer Science: Polymer Phisics Edition, vol. 19, 1073-1080, 1981.
Chatterjee et al., "Poly(ether urethane3) and poly(ether urethane urea) membranes with high H2S/CH4 selectivity", Journal of Membrane Science 135, pp. 99-106, 1997.
Search Report and Written Opinion pertaining to Application No. PCT/US2019/058472 dated Jan. 20, 2020.

* cited by examiner

CROSSLINKED POLYETHYLENE GLYCOL POLYMER MEMBRANES FOR GAS SEPARATION

TECHNICAL FIELD

Embodiments of the present disclosure generally relate to polymer membranes of crosslinked polyethylene glycol network polymer, methods of producing the membranes, and methods of separating gas streams with the membranes.

BACKGROUND

Natural gas is an energy source that may decrease the world's reliance on liquid fuel for generating power. However, many natural gas reservoirs contain a complex mixture of acid gases (such as carbon dioxide ($CO_2$) and hydrogen sulfide ($H_2S$)), higher value heavy hydrocarbons, inert gases, and trace components of other undesirable compounds. The combination of $CO_2$ and/or $H_2S$ with water may be corrosive in certain concentrations, which may result in the destruction of pipelines or other equipment. Furthermore, the presence of $CO_2$ reduces the heating value of natural gas. Therefore, natural gas obtained from natural gas reservoirs or "produced gas" must be processed prior to distribution and usage in order to remove these undesirable components. The bulk removal of these components will decrease the number of post-membrane treatment units (such as acid gas amine scrubbing and cryogenic condensation) and will increase the feed gas quality and flow.

Membrane technology has become a popular alternative for efficient gas separation processes. Due to the manufacturability, low material costs, robust physical characteristics, and suitable intrinsic transport properties (that is, the passage of small molecules through the membrane), as compared to the conventional method for acid gas separation (for example, acid gas amine scrubbing), polymer membranes are of great research interest in the membrane technology field. However, polymer membranes designed for gas separations are known to have a trade-off between permeability and selectivity. In addition, there are other significant material challenges, such as physical aging and plasticization that must be addressed.

Glassy polymers, such as cellulose acetate (CA) and polyether block amide (such as Pebax®, available from Arkema), are used for sour gas removal from natural gas due to their high thermal stability. CA polymer membranes may be used for $CO_2$ separation and exhibit a relatively high pure gas carbon dioxide/methane ($CO_2/CH_4$) selectivity of approximately 30, compared to other commercially available membranes. However, due to easy plasticization of the polymer membrane at high gas stream pressures of greater than 800 psi or in the presence of significant amounts of higher-hydrocarbon (that is, $C_7+$) contaminants, glassy polymers, such as CA, exhibit relatively low $H_2S/CH_4$ mixed gas selectivities (about 30) and exhibit very low $CO_2$ permeability (about 5 Barrer), compared to other commercially available membranes. These low qualities do not meet some industrial requirements. Furthermore, the conventional CA membrane may swell and plasticize in gas streams with as little as 1 percent by volume (vol. %) $H_2S$, reducing its selectivity and limiting its applicability. In applications where larger quantities of $H_2S$ are present, a conventional polyether block amide membrane may be used (such as Pebax®). However, polyether block amide membranes exhibit a low $CO_2/CH_4$ selectivity of about 12. Moreover, these conventional polymers require operationally-complex synthetic processes that often involve high temperatures (well above 50° C.), one or more catalysts, and one or more solvents.

SUMMARY

Ongoing needs exist to obtain polymer membranes that have a balance of suitable levels of (1) thermal stability, (2) pressure stability, (3) permeability and selectivity in pure gas streams, and (4) permeability and selectivity in mixed gas streams. Moreover, ongoing needs exist to produce such a polymer membrane at moderate temperatures (that is, at or below 50° C.) without the use of a catalyst, and with minimal or no amounts of solvent. The polymer membranes described in this disclosure achieve these properties and are able to be produced according to these parameters.

One or more embodiments of this disclosure include a polymer membrane comprising a crosslinked polyethylene glycol network polymer according to formula (I):

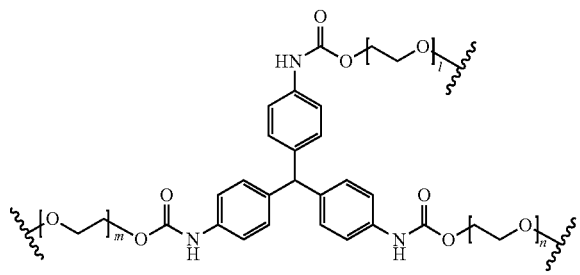

In formula (I), l is an integer from 1 to 50; m is an integer from 1 to 50; and n is an integer from 1 to 50.

In embodiments, methods of gas separation include flowing a gas stream through a polymer membrane comprising a crosslinked polyethylene glycol network polymer according to formula (I); and separating the gas stream via the polymer membrane. In one or more embodiments, l is an integer from 1 to 50; m is an integer from 1 to 50; and n is an integer from 1 to 50.

In embodiments, methods of producing a polymer membrane include reacting polyethylene glycol oligomer and methylidynetri-p-phenylene triisocyanate to produce a crosslinked polyethylene glycol network polymer according to formula (I); and casting the crosslinked polyethylene glycol network polymer according to formula (I) onto a filtration membrane, thereby producing the polymer membrane. In one or more embodiments, l is an integer from 1 to 50; m is an integer from 1 to 50; and n is an integer from 1 to 50.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
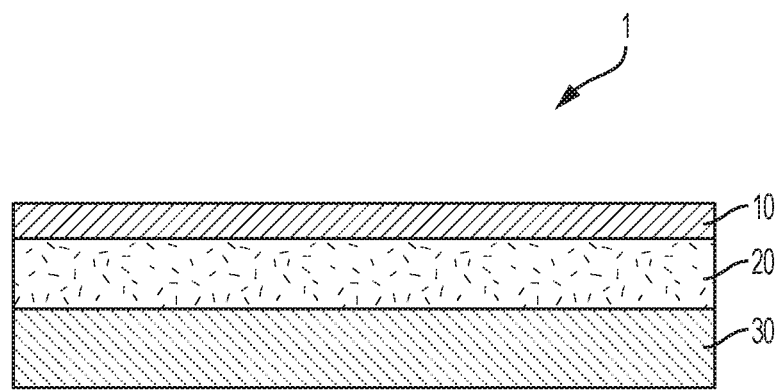
FIG. 1 schematically depicts a cross section of a polymer membrane, according to one or more embodiments described in this disclosure.

As used in this disclosure, the term "permeability" refers to the penetration of a permeate (such as a liquid, gas, or vapor) through a solid, such as the polymer membrane, according to embodiments. The permeability ($P_i$) of a gas (i) may be calculated according to the steady state equation shown in Equation 1:

$$P_i = \frac{\frac{dp}{dt} V \delta}{A p R T}$$

where V=effective downstream volume, δ=membrane thickness, A=surface area of membrane, p=average upstream pressure, R=ideal gas constant, T=temperature and dp/dt is assumed to be the steady state change in downstream pressure over a specific time interval.

As used in this disclosure, the term "selectivity" refers to the level to which the membrane is able to separate one gas species from another. The single gas selectivity ($\alpha_{i,j}$)—sometimes written as i/j (for example, $CO_2/CH_4$)—is calculated as the ratio of single gas permeabilities. The single gas selectivity ($\alpha_{i,j}$) may be calculated according to the equation shown in Equation 2:

$$\alpha_{i,j} = \frac{P_i}{P_j}$$

where Pi>Pj.

Overall, permeability and selectivity are inherent material properties which may be compared to values reported in literature. Cellulose acetate membranes (CA) are the current industrial standard for acid gas separations. However, conventional CA membranes have a low $CO_2$ permeability of about 5 Barrer and a relatively low $H_2S/CH_4$ selectivity of about 30.

Embodiments of the present disclosure are directed to polymer membranes produced by crosslinking polyethylene glycol and methylidynetri-p-phenylene triisocyanate (PTI), methods of producing the polymer membranes, and methods of separating gas using the polymer membranes. The polymer membranes described in this disclosure have improved selectivity separating hydrocarbons and sour gases, such as carbon dioxide, methane, and hydrogen sulfide, and may be used in feed streams with an $H_2S$ concentration of greater than 1 vol. %, greater than 2 vol. %, greater than 5 vol. %, greater than 7 vol. %, greater than 10 vol. %, greater than 15 vol. %, or greater than 20 vol. %.

In one or more embodiments, a polymer membrane includes a crosslinked polyethylene glycol network polymer. The polymer forms crosslinks through the addition of PTI. Polyethylene glycol oligomers react with the isocyanate groups (that is, a formula of N=C=O) of the PTI and forms a urethane functional group, thereby crosslinking polyethylene glycol oligomers with PTI. The polymer membrane produced by this process may include a structure according to formula (I):

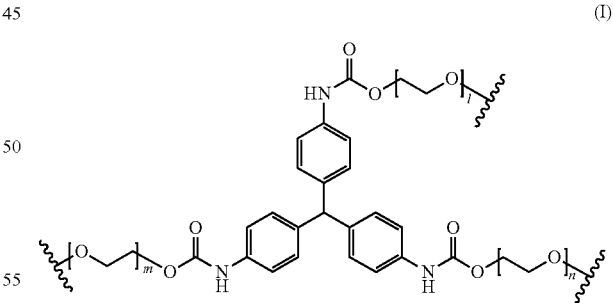

In formula (I), l is an integer from 1 to 50; m is an integer from 1 to 50; and n is an integer from 1 to 50. The letters l, m, and n correlate with the molecular weight ($M_n$) of the polymer membrane of formula (I). For example, the molecular weight of a polyethylene glycol monomer is 18.02+44.05z g/mol, with z correlating with the integers represented by letters l, m, and n. This means that when l is 1, the molecular weight of the polyethylene glycol used in the polymer membrane is 62.07 g/mol. When l is 50, the molecular weight of the polyethylene glycol used in the polymer membrane is 2,220.52 g/mol. The wavy line represents the degree of crosslinking achieved in the crosslinked polyethylene glycol network polymer.

Integers correlating with l, m, and n that are above 50 may result in defective membranes, and may therefore be unfit for performing gas separation. Integers correlating with l, m, and n ranging from 1 to 50 exhibit superior selectivity and permeability performance for gas separation as compared to integers over 50. Moreover, integers correlating with l, m, and n ranging from 9 to 23 exhibit especially enhanced selectivity and permeability performance for separating gases as compared to integers outside that range. Without being bound by theory, it is believed that polymer membranes with molecular weights above these ranges become defective from naturally-occurring crystallinity as there are not enough crosslink sites to disrupt its formation. As such, the processing of polymer membranes with molecular weights above these ranges becomes difficult and pinhole defects begin to appear as crystalline domains are simultaneously formed and dragged by a knife during the casting process.

In one or more embodiments, l is an integer from 4 to 50, from 6 to 50, from 9 to 50, from 4 to 35, from 6 to 35, from 9 to 35, from 4 to 23, from 6 to 23, from 9 to 23, from 13 to 23, from 9 to 14, or from any other suitable range between 1 and 50. Similarly, in embodiments, m is an integer from 4 to 50, from 6 to 50, from 9 to 50, from 4 to 35, from 6 to 35, from 9 to 35, from 4 to 23, from 6 to 23, from 9 to 23, from 13 to 23, from 9 to 14, or from any other suitable range between 1 and 50. Further, in embodiments, m is an integer from 4 to 50, from 6 to 50, from 9 to 50, from 4 to 35, from 6 to 35, from 9 to 35, from 4 to 23, from 6 to 23, from 9 to 23, from 13 to 23, from 9 to 14, or from any other suitable range between 1 and 50. In some embodiments, the integers l, m, and n may be the same. In other embodiments, the integers l, m, and n may be different.

Referring now to FIG. 1, a polymer membrane 1 according to embodiments includes a crosslinked polyethylene glycol network polymer 10. In some embodiments, not shown, the crosslinked polyethylene glycol network polymer 10 may be a freestanding membrane having suitable mechanical characteristics for use as the crosslinked polyethylene glycol network polymer 10 in a separation system. In other embodiments, as shown, the crosslinked polyethylene glycol network polymer 10 may be supported on a filtration membrane 20 to provide additional mechanical suitability for use as the polymer membrane 1 in a separation system. The crosslinked polyethylene glycol network polymer 10 may be coated onto the filtration membrane 20 by conventional techniques such as knife casting. Once cast, the polyethylene glycol network polymer 10 may be dried and heat treated so that it may undergo vitrification and continue to crosslink. In some embodiments, additional mechanical stability may be imparted to the polymer membrane 1 by a polyester support layer 30. Thus, in some embodiments, the polymer membrane 1 may include the crosslinked polyethylene glycol network polymer 10, the polyester support layer 30 that provides structural support to the crosslinked polyethylene glycol network polymer 10, and the filtration membrane 20 that is interposed between the crosslinked polyethylene glycol network polymer 10 and the polyester support layer 30. In some embodiments, the filtration membrane 20 and the polyester support layer 30 have substantially similar tensile strengths. As such, the tensile strength of each of the filtration membrane 20 and the polyester support layer 30 is directly proportional to each of their thicknesses.

As such, in one or more embodiments, the polymer membrane 1 further includes the filtration membrane 20, which acts as a support for the crosslinked polyethylene glycol network polymer. The filtration membrane 20 may be affixed to the crosslinked polyethylene glycol network polymer 10 through any suitable means. For example, the crosslinked polyethylene glycol network polymer 10 may be knife cast onto the filtration membrane 20. Examples of materials that may be used as the filtration membrane 20 include, but are not limited to, polyacrylonitriles, poly (vinylidene fluorides), polycarbonates, polyamides, cellulose acetates, polymer sulfones, polyether ketones, polyether ether ketones, polyether sulfones, or combinations of these. The material of the filtration membrane 20 may be a microporous polymer or copolymer.

In some embodiments, the filtration membrane 20 has a weight average molecular weight cut off (MWCO) ranging from 100,000 Daltons to 200,000 Daltons. In other embodiments, the filtration membrane 20 has a weight average MWCO ranging from 110,000 Daltons to 190,000 Daltons, 120,000 Daltons to 180,000 Daltons, 125,000 Daltons to 175,000 Daltons, 130,000 Daltons to 170,000 Daltons, 140,000 Daltons to 160,000 Daltons, or any other suitable range between 100,000 Daltons and 200,000 Daltons. In certain embodiments, the filtration membrane 20 has a weight average MWCO of about 150,000 Daltons.

In one or more embodiments, the filtration membrane further includes the polyester support layer 30. Without being bound by theory, the polyester support layer 30 provides additional support for the crosslinked polyethylene glycol network polymer 10. Suitable materials for the polyester support layer 30 may include nonwoven materials such as, but not limited to, polyesters, cellulose derivatives, polyethylene, polypropylene, poly(alkylamides), poly(aryl amides), or combinations of these. Examples of suitable polyesters may include, but are not limited to polylactic acid, polycaprolactone, polyhydroxyalkanoate, polyhydroxybutyrate, polyethylene adipate, polybutylene succinate, poly(3-hydroxybutyrate-co-3-hydroxyvalerate), polyethylene terephthalate, polybutylene terephthalate, biaxially-oriented polyethylene terephthalate, polytrimethylene terephthalate, polyethylene naphthalate, or combinations of these.

In embodiments, the crosslinked polyethylene glycol network polymer 10 has a thickness of from 10 micrometers (μm) to 100 μm. In other embodiments, the crosslinked polyethylene glycol network polymer 10 has a thickness of from 10 μm to 90 μm, 10 μm to 80 μm, 10 μm to 75 μm, 15 μm to 75 μm, 15 μm to 70 μm, 15 μm to 65 μm, 15 μm to 60 μm, 20 μm to 60 μm, 20 μm to 55 μm, 20 μm to 50 μm, 25 μm to 50 μm, 30 μm to 50 μm, or from any other suitable range between 10 μm and 100 μm.

One or more embodiments of this disclosure includes a method for producing a polymer membrane according to any of the previously described embodiments. The method may include reacting polyethylene glycol oligomers and methylidynetri-p-phenylene triisocyanate (PTI) to produce a crosslinked polyethylene glycol network polymer according to formula (I); and casting the crosslinked polyethylene glycol network polymer according to formula (I) onto a filtration membrane, thereby producing the polymer membrane, wherein l is an integer from 1 to 50; m is an integer from 1 to 50; and n is an integer from 1 to 50. It is believed that this casting procedure may be easily scaled up and adapted to coat sub-micron thick film composites.

Without being bound by theory, Scheme 1 illustrates the reaction and the reaction product of polyethylene glycol and PTI to produce a polymer membrane according to formula (I). Scheme 1 is not meant to be defining or limiting in its scope, rather it is only meant to provide clarity for when describing the method of producing the polymer membrane, according to embodiments.

Scheme 1: Reaction and Reaction Product of Polyethylene Glycol and PTI

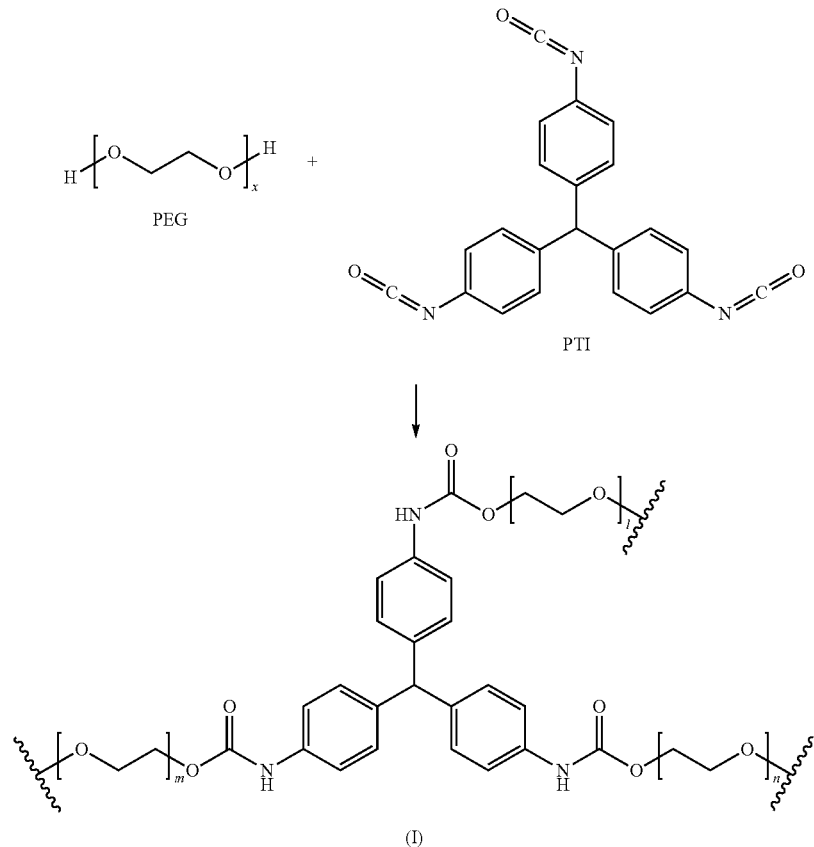

In Scheme 1, PEG is a polyether compound, wherein the letter x represents an integer ranging from 1 to 50, which correlates with the integers represented by l, m, and n in formula (I). The PTI of Scheme 1 is representative of triisocyanate polyether of formula (I). As previously mentioned, Scheme 1 is merely illustrative.

For illustration, formula (II) is an illustrative representation of the crosslinking mechanism of Scheme 1. As would be familiar to the skilled person, the final crosslinked structure would demonstrate significantly more crosslinking; however, this is merely an illustration of the PTI crosslinking which occurs with the copolymerized reaction product of polyethylene glycol and PTI shown in formula (I).

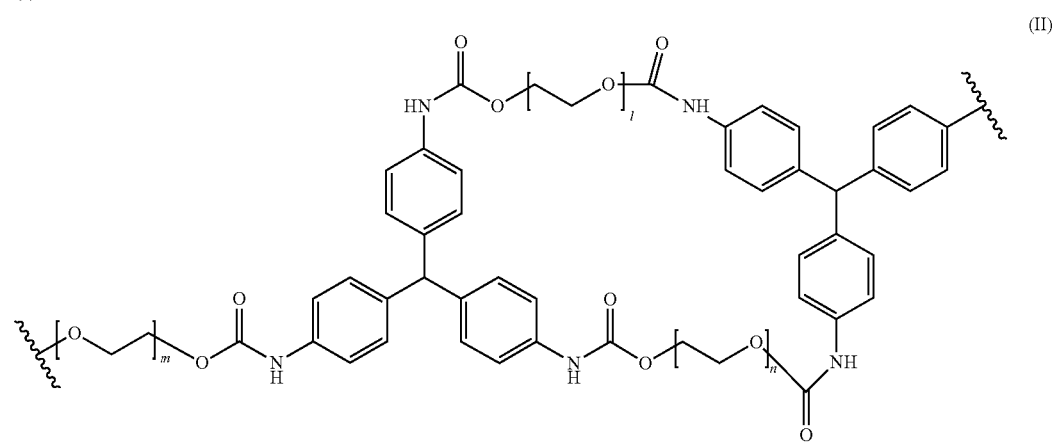

In embodiments, reacting polyethylene glycol oligomer and methylidynetri-p-phenylene triisocyanate includes a reaction time of less than or equal to 100 minutes. In other embodiments, the reaction time ranges from 10 minutes to 100 minutes, 30 minutes to 100 minutes, 80 minutes to 100 minutes, or from any other suitable range between 10 minutes and 100 minutes. The reaction temperature may be from 20° C. (degrees Celsius) to 50° C., from 20° C. to 40° C., from 20° C. to 30° C., from 30° C. to 50° C., from 30° C. to 40° C., or from 40° C. to 50° C. In one or more embodiments, the reaction temperature is about 50° C.

In some embodiments, casting the crosslinked polyethylene glycol network polymer according to formula (I) onto a filtration membrane includes knife casting. Without being bound by theory, the knife casting may be completed by a film casting knife having an adjustable clearance film applicator (that is, a variable gap height). According to embodiments, the film casting knife may have a gap height of from 0 mils to 150 mils (one-thousandth of an inch) in 1 mil increments. In certain embodiments, the film casting knife is set to a 5 mil gap height, which corresponds to when the crosslinked polyethylene glycol network polymer has a thickness of about 20 µm to 50 µm. A suitable film casting knife is commercially available as the 6" square frame applicator produced by BYK-Gardner USA (Columbia, Md.).

In one or more embodiments, the method for producing the polymer membrane may further include dissolving the polyethylene glycol oligomer in an amount of chloroform before combining the polyethylene glycol oligomer and the PTI. Without being bound by theory, larger polyethylene glycol oligomers (that is, oligomers with molecular weights greater than or equal to 600 Daltons) are low-melting solids with melting points ranging from about 20° C. for PEG 600 to about 63° C. for PEG 10,000. Therefore, polyethylene glycol oligomers with such molecular weights may first be dissolved in an amount of aprotic solvent before reacting with PTI to produce the polymer membrane according to formula (I). In embodiments, suitable aprotic solvents may include, but are not limited to, chloroform, dichloromethane, dioxane, n-methyl pyrrolidone, dimethylacetamide, dimethyl sulfoxide, acetonitrile, ethyl acetate, benzene, acetone, or combinations thereof.

One or more embodiments of this disclosure include a method of gas separation. The method may include flowing a gas stream through a polymer membrane comprising a crosslinked polyethylene glycol network polymer according to formula (I), according to any of the previously described embodiments; and separating the gas stream via the polymer membrane, wherein l is an integer from 1 to 50; m is an integer from 1 to 50; and n is an integer from 1 to 50.

Once the polymer membrane is produced, it yields good $CO_2/CH_4$ separation selectivity (at least 13), excellent $H_2S/CH_4$ separation selectivity (at least 30), and good gas permeabilities for both $CO_2$ (at least 5 Barrer) and $H_2S$ (at least 10 Barrer), all of which will be described in detail in the Examples section of the disclosure. Moreover, the polymer membrane exhibits high chemical and mechanical stability even when exposed to feed streams that include sour gas that are delivered at high pressures, such as equal to or greater than 800 psi (pounds per square inch) at 25° C. As such, the polymer membrane is capable of separating gas mixtures having sour components at pressures of equal to or greater than 800 psi, equal to or greater than 900 psi, or equal to or greater than 1000 psi.

As used herein, the term "sour gas" means natural gas or any other gas containing significant amounts of $CO_2$ and $H_2S$. Natural gas is typically considered to be sour if there is more than 5.7 mg (milligrams) of $H_2S$ per cubic meter of natural gas, which is equivalent to approximately 4.0 ppmv (parts per million by volume) under standard temperature and pressure. Natural gas may include methane, ethane, propane, other heavier hydrocarbons, nitrogen gas, carbon dioxide, hydrogen sulfide, and trace amounts of water.

In embodiments, the gas stream may include methane ($CH_4$), carbon dioxide ($CO_2$), hydrogen sulfide ($H_2S$), or combinations thereof. In certain embodiments, the gas stream includes about 92 vol. % $CH_4$, about 5 vol. % $H_2S$, and about 3 vol. % $CO_2$. Such a gas stream was chosen to approximate a typical composition of sour natural gas. Similarly, in one or more embodiments, the gas stream comprises greater than or equal to 4.0 ppmv of $H_2S$.

In some embodiments, the polymer membrane has a $CO_2/CH_4$ selectivity of at least 13 when exposed to a mixed gas stream including from 1 vol. % to 5 vol. % $CO_2$, from 1 vol. % to 10 vol. % $H_2S$, and from 80 vol. % to 98 vol. % $CH_4$ at 800 psi and 25° C. In some embodiments, the polymer membrane has a $CO_2/CH_4$ selectivity of at least 13 when exposed to a mixed gas stream including 3 vol. % $CO_2$, 5 vol. % $H_2S$, and 92 vol. % $CH_4$ at 800 psi and 25° C. In other embodiments, the polymer membrane has a $CO_2/CH_4$ selectivity of at least 14, at least 16, at least 18, at least 20, or at least 25.

In one or more embodiments, the polymer membrane has an $H_2S/CH_4$ selectivity of at least 30 when exposed to a mixed gas stream including from 1 vol. % to 5 vol. % $CO_2$, from 1 vol. % to 10 vol. % $H_2S$, and from 80 vol. % to 98 vol. % $CH_4$ at 800 psi and 25° C. In one or more embodiments, the polymer membrane has an $H_2S/CH_4$ selectivity of at least 30 when exposed to a mixed gas stream including 3 vol. % $CO_2$, 5 vol. % $H_2S$, and 92 vol. % $CH_4$ at 800 psi and 25° C. In some embodiments, the polymer membrane has an $H_2S/CH_4$ selectivity of at least 35, at least 40, at least 45, at least 50, at least 55, at least 60, at least 65, at least 70, at least 75, at least 80, at least 85, or at least 90.

In embodiments, the polymer membrane has a $CO_2$ permeability of at least 5 Barrer when exposed to a mixed gas stream including from 1 vol. % to 5 vol. % $CO_2$, from 1 vol. % to 10 vol. % $H_2S$, and from 80 vol. % to 98 vol. % $CH_4$ at 800 psi and 25° C. In embodiments, the polymer membrane has a $CO_2$ permeability of at least 5 Barrer when exposed to a mixed gas stream including 3 vol. % $CO_2$, 5 vol. % $H_2S$, and 92 vol. % $CH_4$ at 800 psi and 25° C. In other embodiments, the polymer membrane has a $CO_2$ permeability of from 5 to 50 Barrer, from 5 to 45 Barrer, from 5 to 40 Barrer, from 5 to 35 Barrer, from 5 to 30 Barrer, 5 to 25 Barrer, from 5 to 20 Barrer, from 5 to 15 Barrer, from 6 to 15 Barrer, from 7 to 15 Barrer, from 5 to 10 Barrer, from 6 to 10 Barrer, or from 7 to 10 Barrer.

In embodiments, the polymer membrane has an $H_2S$ permeability of at least 10 Barrer when exposed to a mixed gas stream including from 1 vol. % to 5 vol. % $CO_2$, from 1 vol. % to 10 vol. % $H_2S$, and from 85 vol. % to 98 vol. % $CH_4$ at 800 psi and 25° C. In embodiments, the polymer membrane has an $H_2S$ permeability of at least 10 Barrer when exposed to a mixed gas stream including 3 vol. % $CO_2$, 5 vol. % $H_2S$, and 92 vol. % $CH_4$ at 800 psi and 25° C. In other embodiments, the polymer membrane has an $H_2S$ permeability of from 10 to 100 Barrer, from 10 to 90 Barrer, from 10 to 80 Barrer, from 10 to 70 Barrer, from 10 to 60 Barrer, 10 to 50 Barrer, from 15 to 50 Barrer, from 10 to 45

Barrer, from 15 to 45 Barrer, from 20 to 45 Barrer, from 25 to 45 Barrer, from 25 to 40 Barrer, or from 30 to 40 Barrer.

Without being bound by theory, these results may be explained in terms of intermolecular and intramolecular interactions. It is believed that since $CO_2$ has a favorable affinity to the ether bonds in the crosslinked PEG backbone, increasing the PEG chain length leads to higher permeability and also increases the likelihood of the interactions with $CO_2$, thereby eliciting improved selectivity.

EXAMPLES

Preparation of the Polymer Membrane According to Formula (I)

Synthetic Procedure: A vial was filled with 5 g (grams) of polyethylene glycol (PEG) oligomers. Some of the PEG oligomers are liquids at room temperature (that is, those with molecular weights of 200 Daltons, 300 Daltons, and 400 Daltons) and were then reacted in bulk. However, the high molecular weight PEG oligomers (that is, those with molecular weights of greater than 400 Daltons), were first dissolved in 3.3 mL (milliliters) of chloroform to create a 50 wt. % solution of PEG, rolled under an infrared radiation lamp for about four hours, and stirred at 50° C. until a homogenous solution was formed.

Next, the atmosphere present in the vial was replaced with a flow of nitrogen gas. After 15 minutes, a stoichiometric amount of 27% methylidynetri-p-phenylene triisocyanate (PTI) in ethyl acetate was transferred to the vial with a dry syringe. The nitrogen flow was maintained during the addition of PTI to evaporate the ethyl acetate. The reaction between the PEG oligomers and PTI then proceeded until the reaction solution reached a viscosity of about 150 cP (centipoise) to 200 cP. As such, the reaction time was dependent upon the molecular weight of the PEG oligomer and the evaporation rate of the ethyl acetate, and ranged from 10 minutes to 100 minutes. The specific conditions for reach reaction are summarized in Table 1.

TABLE 1

PEG Oligomer and PTI Reaction Conditions

| PEG Molecular Weight (Daltons) | Amount of Chloroform Added (mL) | Amount of PTI Added (mL) | Reaction Time (Minutes) |
| --- | --- | --- | --- |
| 200 | — | 25.50 | 100 |
| 300 | — | 17.00 | 100 |
| 400 | — | 12.70 | 100 |
| 600 | 3.3 | 8.50 | 100 |
| 1,000 | 3.3 | 5.10 | 80 |
| 2,050 | 3.3 | 2.50 | 10 |
| 4,600 | 3.3 | 1.11 | 30 |
| 10,000 | 3.3 | 0.51 | 30 |

Casting Procedure: The resulting polymer produced by the previously described process could not be precipitated and redissolved due to its highly-crosslinked properties; once gelation occurred, the polymers became wholly insoluble. This insolubility was a result of polymer crosslinking densities from $1 \times 10^{-3}$ mol/cm³ to $3 \times 10^{-3}$ mol/cm³ and gel fractions of greater than 90%. As such, the reaction solution needed to be cast onto a membrane support.

Upon the reaction solution reaching about 150 cP to 200 cP, it was knife cast onto a polyacrylnitrile (PAN) filtration membrane support having a weight average molecular weight cut off (MWCO) of 150,000 Daltons with a woven polyester backing. The knife was set to a 5 mil gap height, which corresponds to the crosslinked polyethylene glycol network polymer being disposed in a layer having a thickness of about 20 μm to 50 μm to produce the polymer membrane.

The polymer membrane was then dried under a fume hood and covered for 16 hours to allow for slow vitrification and continued crosslinking. The polymer membrane was then transferred to a vacuum oven and dried at 70° C. under low vacuum (from 0.1 to 1 inches Hg) for at least another 16 hours to remove residual solvent. After drying, the polymer membrane was then gradually equilibrated to atmospheric temperature and pressure.

Such a polymer membrane is shown in FIG. 1, as previously described, which shows the polymer membrane 1 according to any of the previously described embodiments.

Polymer Membrane Test Preparation: After the polymer membrane was produced, swatches with surface areas of from 0.5 cm² (square centimeters) to 2.0 cm² were individually cut and used for permeation tests. The polymer membrane swatches were then masked with aluminum foil and sealed with a two-component, quick-setting epoxy. The epoxy was cured for at least two hours before the polymer membrane swatches were loaded into a permeation cell. The reaction was completed eight times corresponding to each of the PEG oligomers described in Table 1 to produce eight polymer membranes. Each of the eight polymer membranes were then subjected to various studies to confirm their structures and properties. The studies are described below.

Studies

The eight inventive polymer membranes (which will now be referred to as PEG 200, PEG 300, PEG 400, PEG 600, PEG 1,000, PEG 2,050, PEG 4,600, and PEG 10,000, respectively) as prepared above were studied. For some of the tests, the inventive polymer membranes were compared to a cellulose acetate (CA) membrane and/or a Pebax® membrane.

The comparative CA membrane was obtained from Sigma-Aldrich (St. Louis, Mo.), and had a number average molecular weight of 50,000 Daltons and a 39.7 wt. % acetyl content. The comparative CA membrane was produced by preparing a 12 wt. % solution in acetone, sonicated to remove dissolved gases. The CA membrane was then cast with a blade in a glove bag saturated with acetone vapor. After the solvent evaporated and the CA membrane vitrified, the resulting CA films had thicknesses from 20 μm to 40 μm. The CA films were then dried under vacuum at 120° C. to fully remove any lingering solvent.

The comparative Pebax® 1657 resin was obtained from Arkema (Colombes, France). The Pebax® films were formed by dissolving 4 wt. % resin in a 70:30 ethanol to water mixture. The solution was drop cast onto a flat-bottom polytetrafluoroethylene (PTFE) evaporating dish, which was then covered to slow the evaporation of solvent. The Pebax® films were dried under vacuum at 60° C. to fully remove any lingering solvent.

Single Gas Permeability and Selectivity: The permeability of $CO_2$ and $CH_4$ and ideal selectivity ($\alpha$) for $CO_2/CH_4$ (which will be written as $\alpha CO_2/CH_4$) of the eight inventive polymers membranes and the comparative CA membrane was measured by pure gas measurements at 25° C. under 100 psi single gas pressure. The results are shown in FIGS. 2 and 3.

Figure 2:
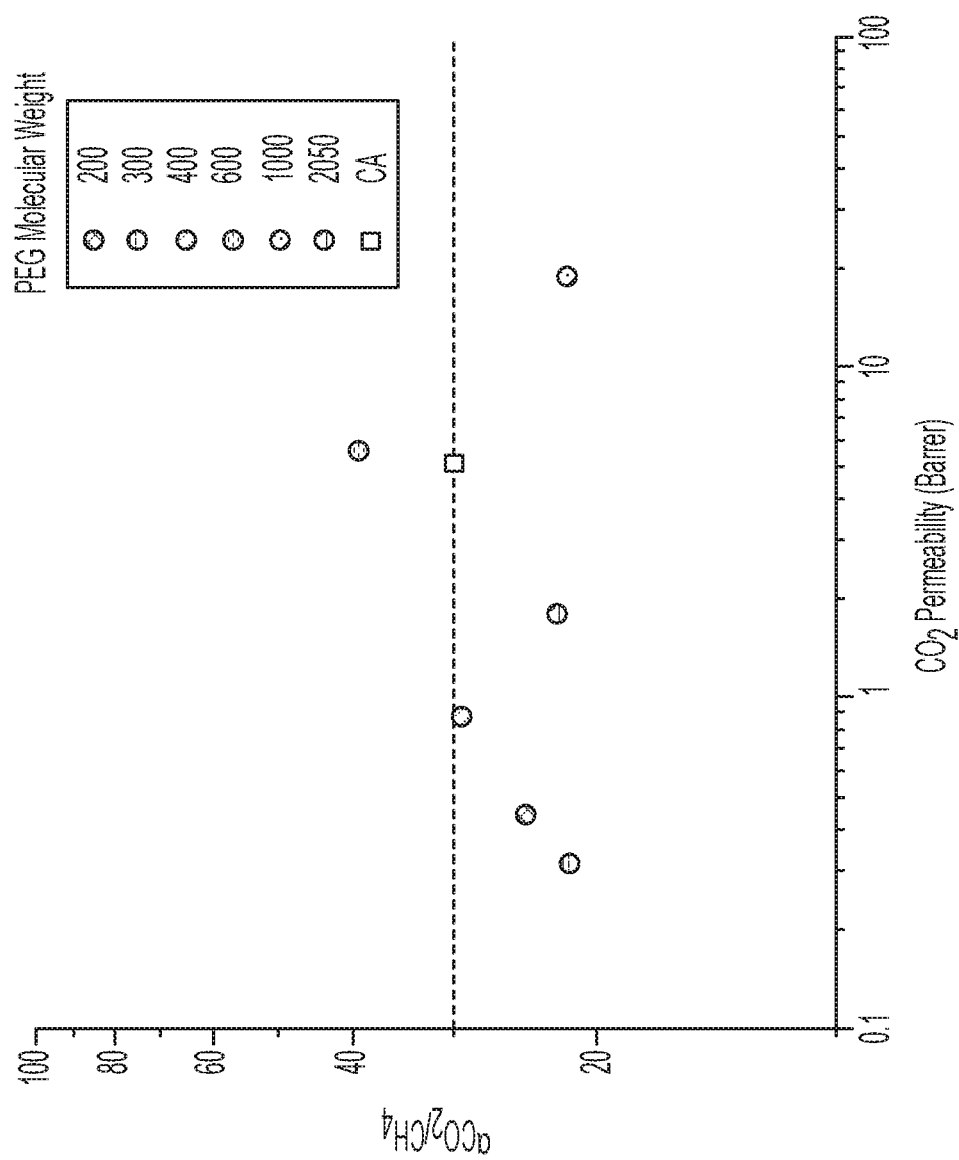
FIG. 2 graphically depicts the $CO_2/CH_4$ selectivity versus the $CO_2$ permeability of various polymer membranes at 100 psi (pounds per square inch), according to one or more embodiments described in this disclosure.

FIG. 2 shows the $\alpha CO_2/CH_4$ of the polymer membranes and the CA membrane plotted against the $CO_2$ permeation performance of the membranes. The PEG polymer membranes having a molecular weight of 4,600 Daltons and 10,000 Daltons were defective, as the films were semi-crystalline, which led to failure during testing. Therefore, no permeability or selectivity data was obtained for these two high molecular-weight polymer membranes, and these membranes are not shown in FIG. 2.

The rest of the polymer membranes (that is, those with molecular weights of less than or equal to 2,050 Daltons) demonstrated good $\alpha CO_2/CH_4$ and adequate $CO_2$ permeability. Some of the inventive polymer membranes outperformed the CA polymer membrane in $CO_2$ permeability, $\alpha CO_2/CH_4$, or both. The polymer membrane produced from PEG with a molecular weight of 600 Daltons is especially noteworthy as it outperformed the CA polymer membrane in both $\alpha CO_2/CH_4$ and $CO_2$ permeability. The polymer membrane produced from PEG with a molecular weight of 1,000 Daltons is also noteworthy, as it demonstrated very good $CO_2$ permeability.

Figure 3:
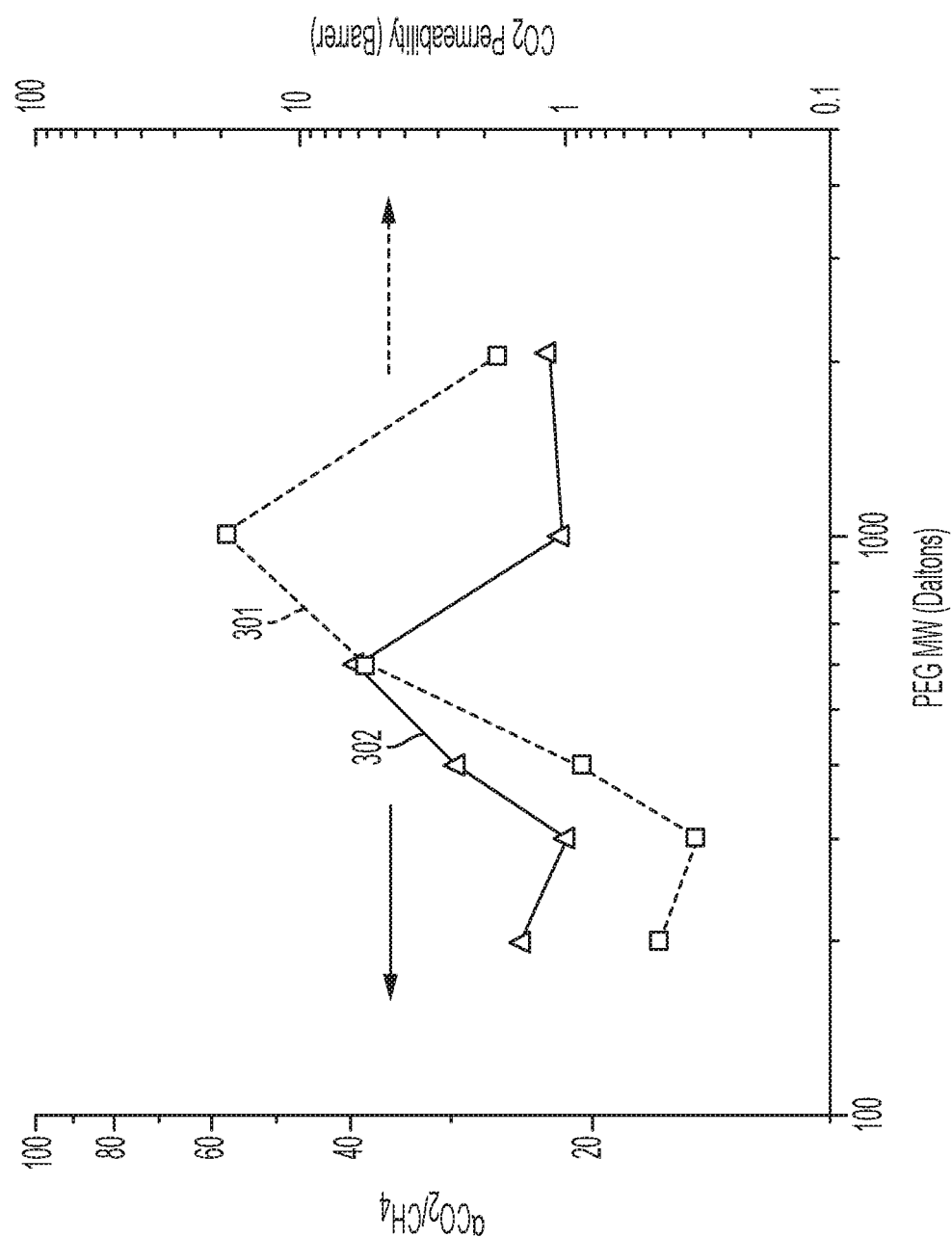
FIG. 3 graphically depicts the $CO_2/CH_4$ selectivity and the $CO_2$ permeability of a polymer membrane versus the molecular weight of the polymer membrane at 100 psi, according to one or more embodiments described in this disclosure.

However, as is shown in FIG. 3, this trend was only observable to a certain molecular weight. Specifically, at PEG oligomer molecular weights above 1,000 Daltons, a sharp decline in both permeability 301 and selectivity 302 was observed. Without being bound by theory, such a decrease may be due to the intermolecular interactions with the polymer membranes that led to semi-crystallinity. As such, the results seen in FIGS. 2 and 3 suggest that the polymer membranes with PEG molecular weights ranging from 400 Daltons to 1,000 Daltons are optimal, with a polymer membrane produced from PEG 600 achieving the most desirable results.

Mixed Gas Permeability and Selectivity: Since the inventive polymer membrane produced from PEG with a molecular weight of 600 Daltons (PEG 600) showed the best results in the single gas system, it was chosen to undergo mixed gas testing for $\alpha CO_2/CH_4$, $\alpha H_2S/CH_4$, $CO_2$ permeability, and $H_2S$ permeability. A CA polymer membrane and a Pebax® polymer membrane were also tested, and the results were compared with the inventive PEG 600 polymer membrane. The polymer membranes were tested using a sour gas mixture of 3 vol. % $CO_2$, 5 vol. % $H_2S$, and 92 vol. % $CH_4$ at 25° C. under 800 psi total pressure for six hours.

Figure 4:
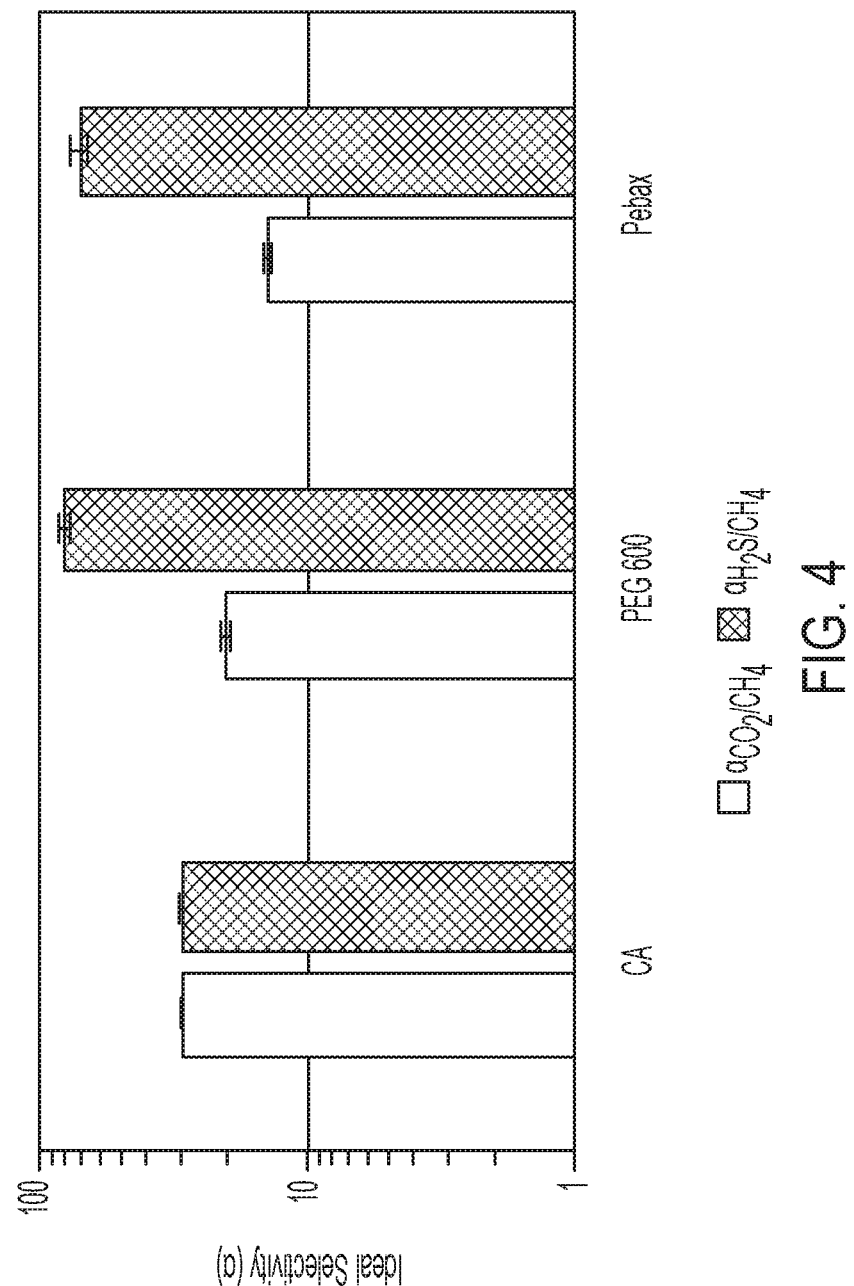
FIG. 4 graphically depicts the $CO_2/CH_4$ selectivity and the $H_2S/CH_4$ selectivity of various polymer membranes at 800 psi and 25° C., according to one or more embodiments described in this disclosure.

FIG. 4 shows the $\alpha CO_2/CH_4$ and $\alpha H_2S/CH_4$ for the inventive PEG 600 polymer membrane, the CA polymer membrane, and the Pebax® polymer membrane in the sour gas system. As is shown in FIG. 4, the PEG 600 polymer membrane exhibited a $\alpha H_2S/CH_4$ of 1.9 times higher than the CA polymer membrane and 1.2 times higher than the Pebax® polymer membrane. Likewise, the PEG 600 polymer membrane exhibited a $\alpha CO_2/CH_4$ of 1.8 times higher than the Pebax® polymer membrane.

Figure 5:
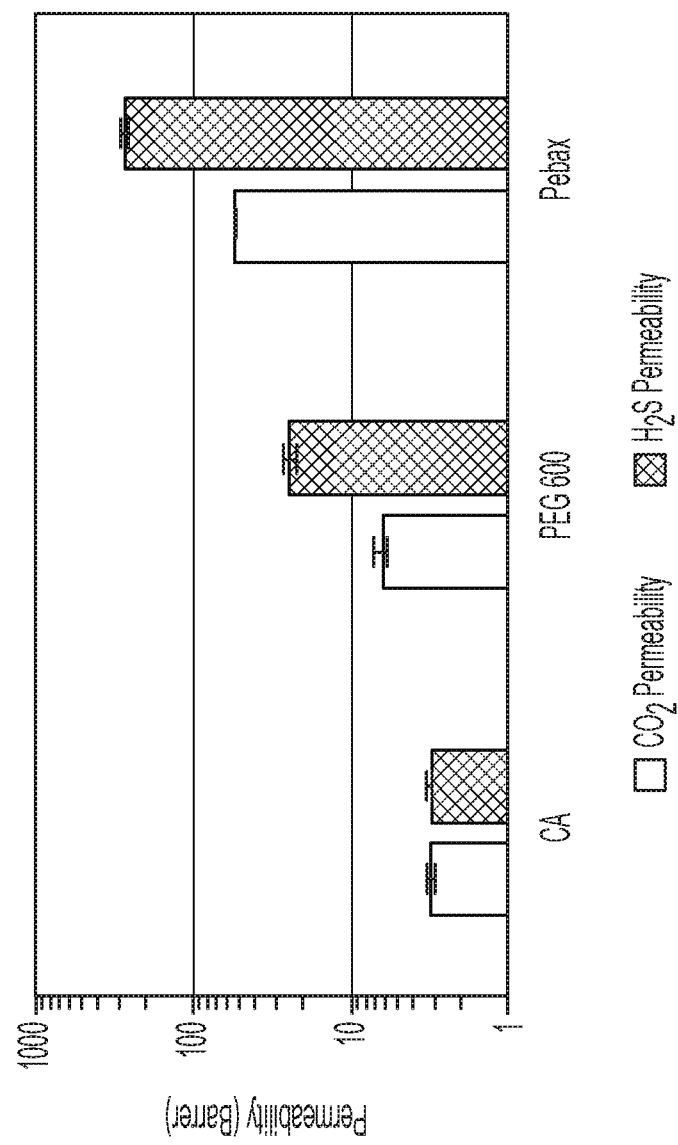
FIG. 5 graphically depicts the $CO_2$ permeability and $H_2S$ permeability of various polymer membranes at 800 psi and 25° C., according to one or more embodiments described in this disclosure.

FIG. 5 shows the $CO_2$ permeability and the $H_2S$ permeability for the inventive PEG 600 polymer membrane, the CA polymer membrane, and the Pebax® polymer membrane in the sour gas system. As is shown in FIG. 5, the PEG 600 polymer membrane showed $CO_2$ and $H_2S$ permeabilities that are between permeabilities of the same gases when tested with CA polymer membrane and the Pebax® polymer membrane. Specifically, the PEG 600 polymer membrane exhibited an $H_2S$ permeability of 3.0 times higher than the CA polymer membrane.

Together, FIGS. 4 and 5 show that the inventive PEG 600 polymer membrane has much improved $\alpha H_2S/CH_4$ while maintaining suitable $\alpha CO_2/CH_4$ and $CO_2$ and $H_2S$ permeabilities in a sour gas system when compared to the CA polymer membrane and the Pebax® polymer membrane. Moreover, the performance of the PEG 600 polymer membrane did not change over the course of the six hour testing, even at the aggressive feed pressure of 800 psi, which indicated high chemical stability. Therefore, the polymer membranes according to any of the previously described embodiments have application for sour gas separation.

Thermogravimetric Analysis (TGA): The inventive polymer membranes were thermally characterized by TGA in order to determine their thermal stability. Small samples of each polymer membrane (about 5 mg to 20 mg) were individually prepared and loaded into TGA pans. Each pan was then heated from room temperature to 600° C. at a constant heat rate of 20° C. per minute using a Discovery TGA from TA Instruments, Inc. (New Castle, Del.). The weight loss profile as a function of temperature was plotted in FIG. 6.

Figure 6:
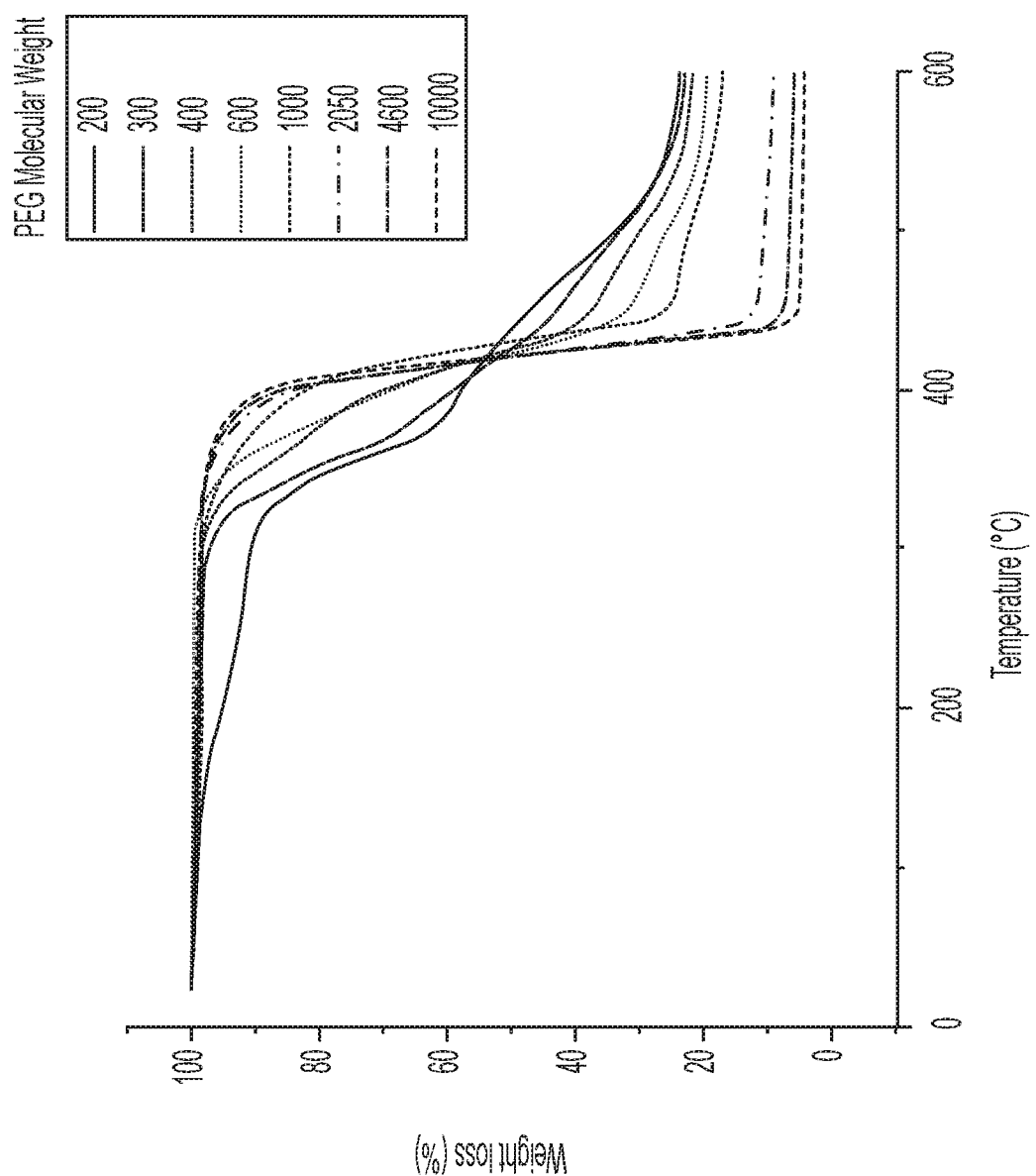
FIG. 6 graphically depicts the thermogravimetric analysis of various polymer membranes by showing the percentage weight loss as temperature increases at a constant heat rate of 20° C./minute from 0° C. to 600° C., according to one or more embodiments described in this disclosure.

In general, FIG. 6 shows that the inventive polymers became more thermally stable with increased PEG content as evidenced by the increase in decomposition temperature (that is, when the weight loss percentage drops below 100%) with increasing molecular weight. Typically, crosslinking is a technique used to strengthen and enhance a composition's resistance to decomposition at high temperatures. Without being bound by theory, it is believed that the amide bond was weaker than the ether bond in the PEG, which led to evolution of weight loss at lower temperatures. As C—N bonds (305 kJ/mol) break at lower temperatures than C—O bonds (358 kJ/mol), small portions of the polymer were released, leading to the observed weight loss. However the majority of membranes (excluding PEG 200) retained thermal stability above 300° C., which is suitable for sour gas separation applications operated at less than or equal to 50° C.

Another noteworthy trend was the increase in char weight with decreased PEG molecular weight. This was a result of the carbon-content basis as the char weight was equal to the wt. % of the polymer membrane remaining after the decomposition (i.e., the wt. % at 600° C.). The low molecular weight PEG polymers have increased PTI crosslinker concentration, which was 72% carbon by mass compared to molecular PEG which is 54.5% carbon by mass. This trend both confirmed the crosslinking reaction proceeded as expected and that the produced polymers behaved as expected at these increasing temperatures. The char weight results for reach reaction are summarized in Table 2.

TABLE 2

Char Weight Results

| PEG Molecular Weight (Daltons) | Char Weight at 600° C. |
|---|---|
| 200 | 23.9% |
| 300 | 23.1% |
| 400 | 21.9% |
| 600 | 19.5% |
| 1,000 | 17.2% |
| 2,050 | 8.9% |
| 4,600 | 5.9% |
| 10,000 | 4.3% |

Differential Scanning Calorimetry (DSC): The inventive polymer membranes were characterized by DSC in order to determine their phase transitions and crystallinity properties. Small samples of each of the inventive polymers (about 5 mg to 20 mg) were individually loaded into sealed aluminum DSC pans. Each pan was twice cycled from −90° C. to 100° C. at 10° C. per minute using a Discovery DSC from TA Instruments, Inc. (New Castle, Del.).

DSC provides insight to the thermal behavior of these inventive polymer membranes. It has been shown that thermal properties have a great impact on permeation performance of polymer membranes. In general, rubbery materials, such as polymer membranes with a glass transition temperature ($T_g$) of less than 25° C. exhibit higher permeability than their glassy counterparts having a $T_g$ of greater than 25° C.

A noteworthy consequence of the crosslinking reaction described herein was that the PEG polymers underwent a substantial shift in $T_g$. Specifically, PEG has a $T_g$ of −55° C. due its highly flexible polyether backbone. As crosslink sites provided by the PTI were introduced to PEG, the flexible polyether backbone became increasingly rigid. As the chain length between crosslink sites decreased, the PEG became rigid and eventually glassy.

Figure 7:
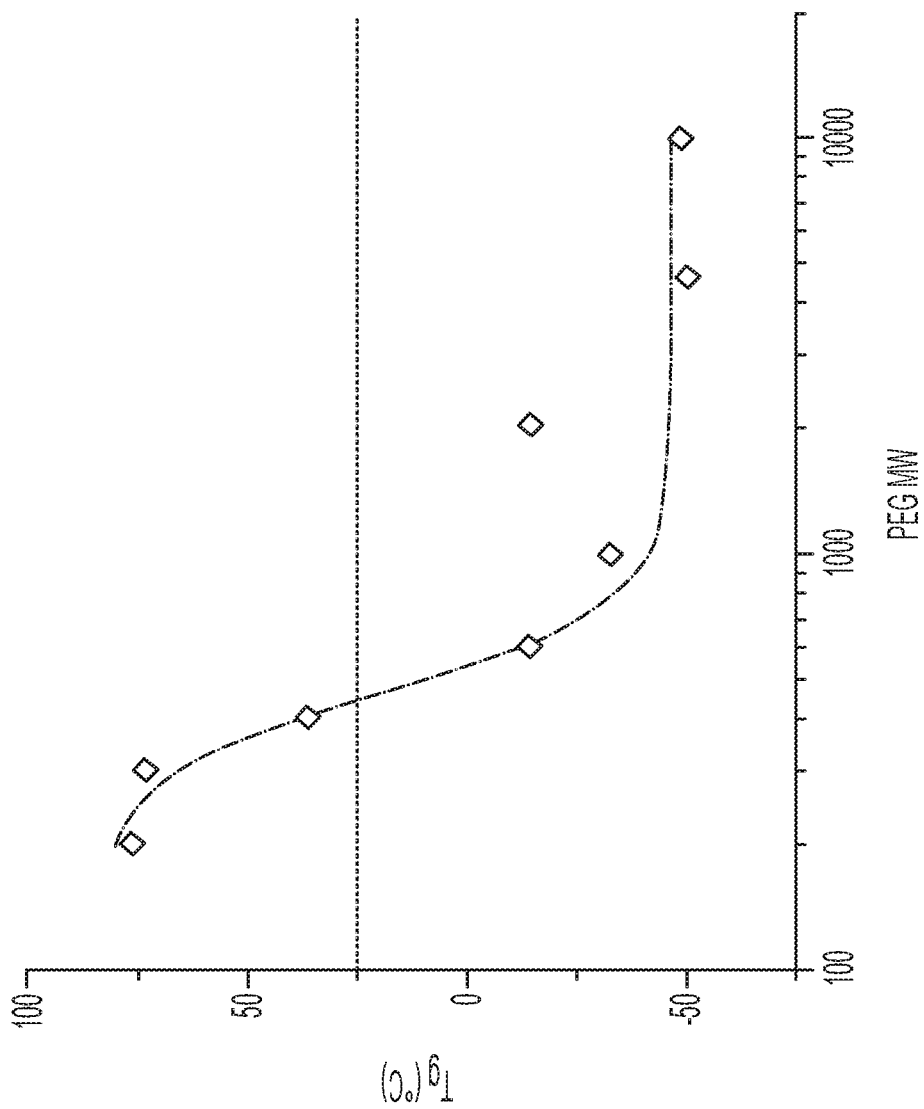
FIG. 7 graphically depicts the glass transition temperature of various polymer membranes versus the molecular weight of the polymer membrane, according to one or more embodiments described in this disclosure.

FIG. 7 shows the $T_g$ of each of the inventive polymer membranes, with a line on the graph at a $T_g$ of 25° C., indicating the transition from a rubbery material to a glassy material, as described previously. FIG. 7 shows that as the PEG molecular weight of the inventive polymer membranes decreased, the $T_g$ increased, and the polymer membranes transitioned from rubbery to glassy (as in, the polymer membranes would have a $T_g$ of 25° C.) at a PEG molecular weight of about 500 Daltons. A corresponding decrease in membrane permeability was observed as the PEG molecular weight decreased from 1,000 to 200, which is consistent with the permeation behavior as the membranes became glassier. Such a result is expected because an increasing PEG molecular weight meant that the inventive polymer membranes incorporated a larger number of flexible units. As such, when the $T_g$ decreased (i.e., becomes more rubbery), the inventive polymer membranes became more permeable.

Figure 8:
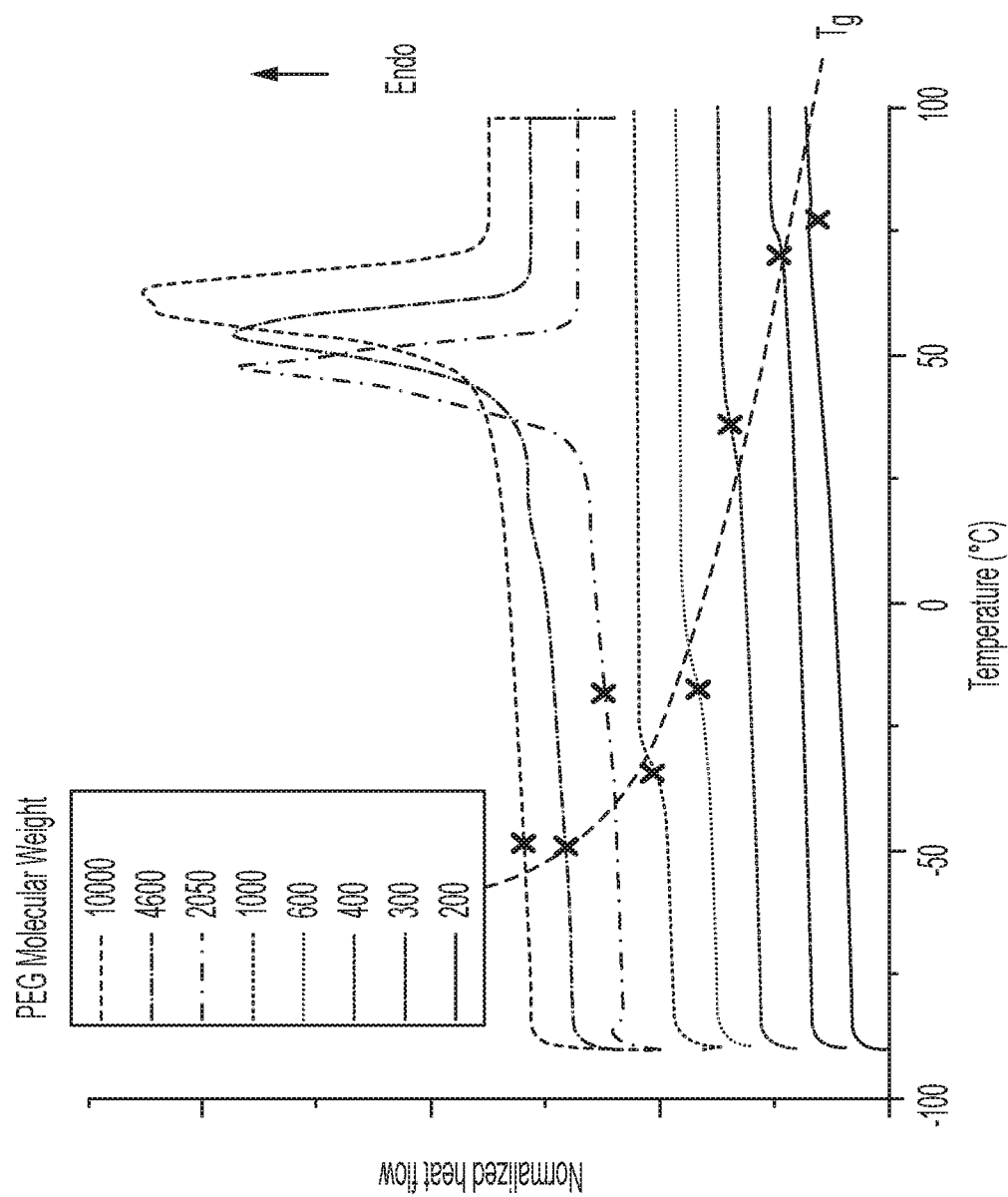
FIG. 8 graphically depicts the normalized heat flow versus temperature of various polymer membranes, with the glass transition temperature of the various polymer membranes overlayed on the graph, according to one or more embodiments described in this disclosure.

However, as also indicated by DSC, the $CO_2$ permeability of these inventive polymer membranes peaked at a molecular weight of about 1,000 Daltons and then dropped substantially. Specifically, FIG. 8 indicates that some of polymer membranes having a PEG molecular weight of 2,050 Daltons and greater became semi-crystalline, as evidenced by the large endotherms, above room temperature. This semi-crystallinity exhibited by the polymer membranes has been shown to decrease the permeability of the polymer membranes. As such, the crosslinked polymer membranes with higher PEG molecular weights (that is, polymer membranes having PEG molecular weights greater than 2,050 Daltons) were semi-crystalline, and the permeability and selectivity of each of these materials were lower than those of the polymer membranes in the series without any such crystallization (such as those with PEG molecular weights of less than or equal to 1,000 Daltons).

Fourier-Transform Infrared Spectroscopy (FTIR): The inventive polymer membranes were characterized by FTIR in order to confirm the structure and chemical arrangement of the crosslinked polyethylene glycol network polymers. A Nicolet™ iS50 FTIR Spectrometer from Thermo Fisher Scientific, Inc. (Waltham, Mass.) was used in ATR mode to sweep from 750 reciprocal centimeters ($cm^{-1}$) to 4,000 $cm^{-1}$. Then, the characteristic peaks of the unique organic groups of the inventive polymers were compared in order to qualitatively confirm crosslinking.

Figure 9:
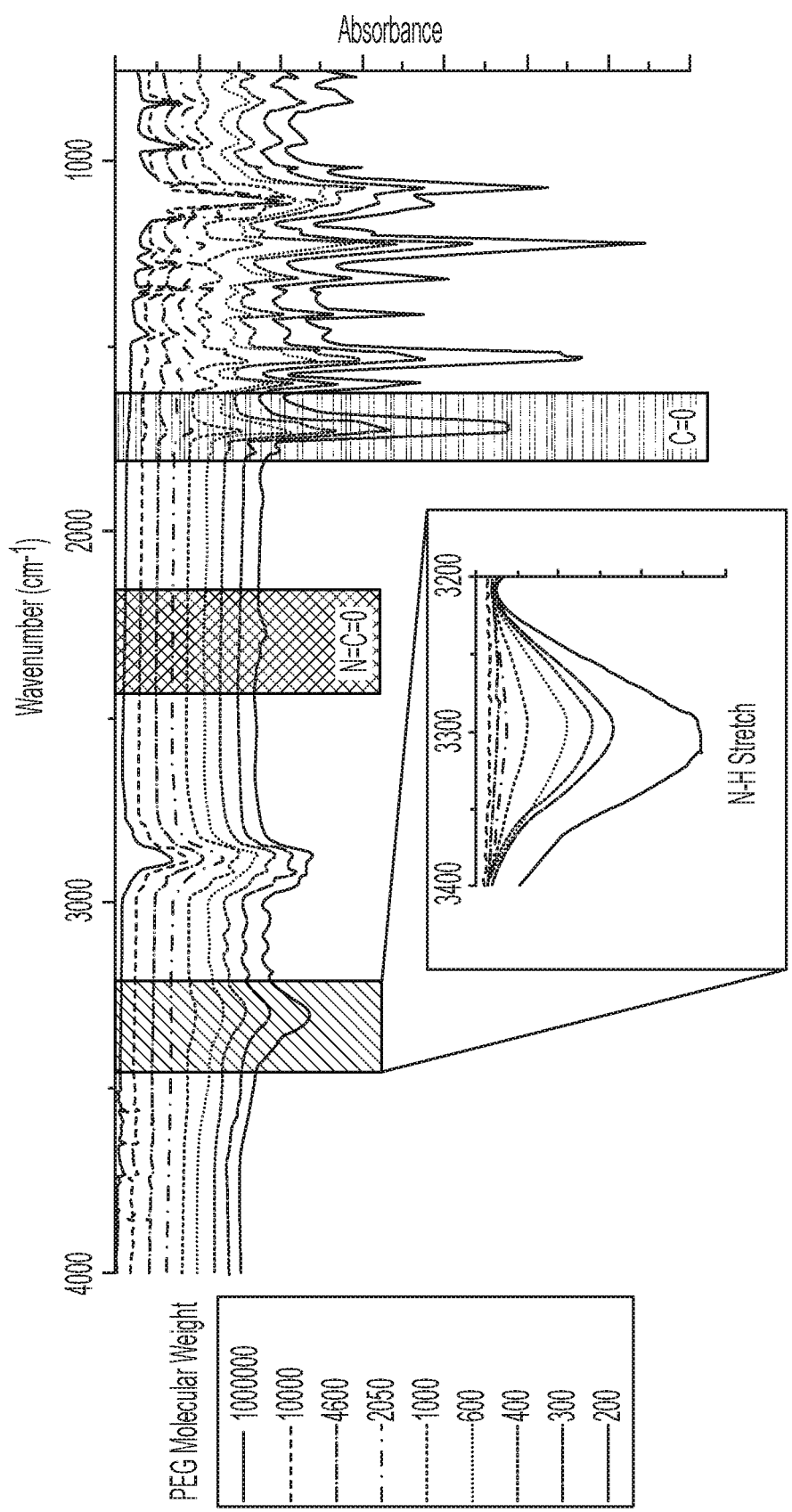
FIG. 9 graphically depicts the infrared spectrum of absorption versus wavenumber of various polymer membranes, according to one or more embodiments described in this disclosure.

FIG. 9 shows the FTIR spectra of all eight of the inventive polymer membranes and a non-crosslinked high-molecular weight PEG film having a molecular weight of 1,000,000 Daltons. Spectra were normalized around the C—H peak at 2,900 $cm^{-1}$. The following characteristic peaks in FIG. 9 are highlighted: the N—H stretch from amide group(s) at 3,220 $cm^{-1}$ to 3,350 $cm^{-1}$; the N=C=O stretch from isocyanate group(s) at 2,100 $cm^{-1}$ to 2,400 $cm^{-1}$; and the C=O stretch from amide group(s) at 1,650 $cm^{-1}$ to 1,750 $cm^{-1}$.

The stretches shown in FIG. 9 confirm that the desired reaction occurred. The amide signals at 3,220 $cm^{-1}$ to 3,350 $cm^{-1}$ and 1,650 $cm^{-1}$ to 1,750 $cm^{-1}$ are accentuated at low molecular weights of polymer membranes. This was due to the increase in crosslink sites. It was also observed that the characteristic N=C=O peak present at 2,100 $cm^{-1}$ to 2,400 $cm^{-1}$ does not exist in these polymer membranes with the exception of PEG 200, the most densely crosslinked and, as a result, the most rigid polymer membrane in the series. The rigidity may restrict the chain mobility during the film casting process which could limit the reaction sites, and increase terminal isocyanate and alcohol groups. This phenomenon was only observed with polymer membranes having PEG molecular weights below 300 Daltons. Other trends include that the absorbance signals in the 1,400 $cm^{-1}$ to 1,500 $cm^{-1}$ range increase as the PEG molecular weight of the polymer membranes decreases. This may be a result of the increased aromatic content of the polymer membrane, as it is believed that the number of cros slink sites increases as the PEG molecular weight of the polymer membranes decreases. The C—H stretch peak at 2,900 $cm^{-1}$ to 3,000 $cm^{-1}$ broadens as the PEG molecular weight decreases for the same reason.

According to a first aspect of the present disclosure, a polymer membrane includes a crosslinked polyethylene glycol network polymer according to formula (I), wherein l is an integer from 1 to 50; m is an integer from 1 to 50; and n is an integer from 1 to 50.

A second aspect of the present disclosure may include the first aspect, wherein the polymer membrane further comprises a filtration membrane, which acts as a support for the crosslinked polyethylene glycol network polymer.

A third aspect of the present disclosure may include any of the first or second aspects, wherein the filtration membrane comprises polyacrylonitrile.

A fourth aspect of the present disclosure may include any of the first through third aspects, wherein the filtration membrane has a molecular weight cut-off ranging from 100,000 Daltons to 200,000 Daltons.

A fifth aspect of the present disclosure may include any of the first through fourth aspects, wherein the filtration membrane further comprises a polyester support layer.

A sixth aspect of the present disclosure may include any of the first through fifth aspects, wherein the crosslinked polyethylene glycol network polymer has a thickness of from 10 μm to 100 μm.

A seventh aspect of the present disclosure may include any of the first through sixth aspects, wherein l is an integer from 13 to 23, m is an integer from 13 to 23, and n is an integer from 13 to 23.

According to an eighth aspect of the present disclosure, a method of gas separation includes flowing a gas stream through a polymer membrane comprising a crosslinked polyethylene glycol network polymer according to formula (I); and separating the gas stream via the polymer membrane, wherein l is an integer from 1 to 50; m is an integer from 1 to 50; and n is an integer from 1 to 50.

A ninth aspect of the present disclosure may include the eighth aspect, wherein the gas stream comprises methane ($CH_4$), carbon dioxide ($CO_2$), hydrogen sulfide ($H_2S$), or combinations thereof.

A tenth aspect of the present disclosure may include the any of the eighth or ninth aspects, wherein the gas stream comprises greater than or equal to 4.0 parts per million by volume (ppmv) of $H_2S$.

An eleventh aspect of the present disclosure may include any of the eighth through tenth aspects, wherein the polymer membrane has a $CO_2/CH_4$ selectivity of at least 10.

A twelfth aspect of the present disclosure may include any of the eighth through eleventh aspects, wherein the polymer membrane has an $H_2S/CH_4$ selectivity of at least 30.

A thirteenth aspect of the present disclosure may include any of the eighth through twelfth aspects, wherein l is an integer from 13 to 23, m is an integer from 13 to 23, and n is an integer from 13 to 23.

According to a fourteenth aspect of the present disclosure, a method of producing a polymer membrane includes reacting polyethylene glycol oligomer and methylidynetri-p-phenylene triisocyanate to produce a crosslinked polyethylene glycol network polymer according to formula (I); and casting the crosslinked polyethylene glycol network polymer according to formula (I) onto a filtration membrane, thereby producing the polymer membrane, wherein l is an integer from 1 to 50; m is an integer from 1 to 50; and n is an integer from 1 to 50.

A fifteenth aspect of the present disclosure may include the fourteenth aspect, wherein reacting polyethylene glycol oligomer and methylidynetri-p-phenylene triisocyanate comprises a reaction time of less than or equal to 100 minutes.

A sixteenth aspect of the present disclosure may include any of the fourteenth or fifteenth aspects, wherein the filtration membrane comprises polyacrylonitrile.

A seventeenth aspect of the present disclosure may include any of the thirteenth through sixteenth aspects, wherein the filtration membrane further comprises a polyester support layer.

An eighteenth aspect of the present disclosure may include any of the thirteenth through seventeenth aspects, wherein l is an integer from 13 to 23, m is an integer from 13 to 23, and n is an integer from 13 to 23.

A nineteenth aspect of the present disclosure may include any of the thirteenth through eighteenth aspects, wherein the casting comprises knife casting.

A twentieth aspect of the present disclosure may include any of the thirteenth through nineteenth aspects, further including dissolving the polyethylene glycol oligomer in an amount of aprotic solvent before combining the polyethylene glycol oligomer and the methylidynetri-p-phenylene triisocyanate.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

It will be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

The invention claimed is:

1. A polymer membrane comprising a crosslinked polyethylene glycol network polymer according to formula (I):

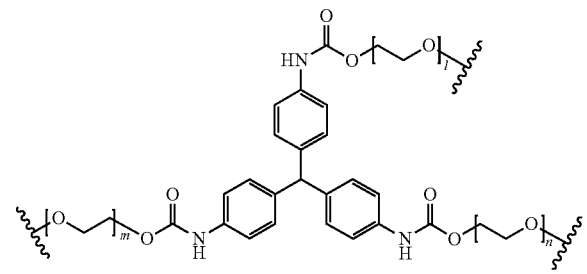

wherein:
l is an integer from 1 to 50;
m is an integer from 1 to 50;
n is an integer from 1 to 50; and
the polymer membrane is synthesized at a temperature less than or equal to 50° C.

2. The polymer membrane of claim 1, wherein the polymer membrane further comprises a filtration membrane, which acts as a support for the crosslinked polyethylene glycol network polymer.

3. The polymer membrane of claim 2, wherein the filtration membrane comprises polyacrylonitrile.

4. The polymer membrane of claim 2, wherein the filtration membrane has a molecular weight cut-off ranging from 100,000 Daltons to 200,000 Daltons.

5. The polymer membrane of claim 2, wherein the filtration membrane further comprises a polyester support layer.

6. The polymer membrane of claim 1, wherein the crosslinked polyethylene glycol network polymer has a thickness of from 10 μm to 100 μm.

7. The polymer membrane of claim 1, wherein l is an integer from 13 to 23, m is an integer from 13 to 23, and n is an integer from 13 to 23.

8. A method of gas separation comprising:
flowing a gas stream through a polymer membrane comprising a crosslinked polyethylene glycol network polymer according to formula (I):

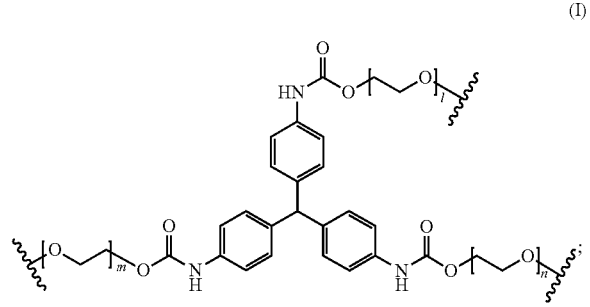
(I)

and separating the gas stream via the polymer membrane, wherein:

l is an integer from 1 to 50;
m is an integer from 1 to 50;
n is an integer from 1 to 50; and
the polymer membrane is synthesized at a temperature less than or equal to 50° C.

9. The method of claim 8, wherein the gas stream comprises methane ($CH_4$), carbon dioxide ($CO_2$), hydrogen sulfide ($H_2S$), or combinations thereof.

10. The method of claim 8, wherein the gas stream comprises greater than or equal to 4.0 parts per million by volume (ppmv) of $H_2S$.

11. The method of claim 8, wherein the polymer membrane has a $CO_2/CH_4$ selectivity of at least 10.

12. The method of claim 8, wherein the polymer membrane has an $H_2S/CH_4$ selectivity of at least 30.

13. The method of claim 8, wherein l is an integer from 13 to 23, m is an integer from 13 to 23, and n is an integer from 13 to 23.

14. A method of producing a polymer membrane comprising:

reacting polyethylene glycol oligomer and methylidynetri-p-phenylene triisocyanate to produce a crosslinked polyethylene glycol network polymer according to formula (I):

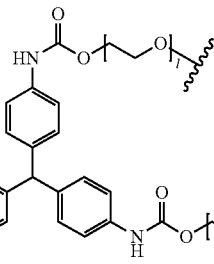
(I)

and casting the crosslinked polyethylene glycol network polymer according to formula (I) onto a filtration membrane, thereby producing the polymer membrane, wherein:

l is an integer from 1 to 50;
m is an integer from 1 to 50;
n is an integer from 1 to 50; and
the polymer membrane is synthesized at a temperature less than or equal to 50° C.

15. The method of claim 14, wherein reacting polyethylene glycol oligomer and methylidynetri-p-phenylene triisocyanate comprises a reaction time of less than or equal to 100 minutes.

16. The method of claim 14, wherein the filtration membrane comprises polyacrylonitrile.

17. The method of claim 14, wherein the filtration membrane further comprises a polyester support layer.

18. The method of claim 14, wherein l is an integer from 13 to 23, m is an integer from 13 to 23, and n is an integer from 13 to 23.

19. The method of claim 14, wherein the casting comprises knife casting.

20. The method of claim 14, further comprising dissolving the polyethylene glycol oligomer in an amount of an aprotic solvent before combining the polyethylene glycol oligomer and the methylidynetri-p-phenylene triisocyanate.

* * * * *